R. S. BUTLER

March 1, 1932. FILTER APPARATUS Re. 18,369

Original Filed Dec. 12, 1928 7 Sheets-Sheet 1

Inventor

Robert Stuart Butler

By Lyon & Lyon Attorneys

R. S. BUTLER

FILTER APPARATUS

March 1, 1932.

Re. 18,369

Original Filed Dec. 12, 1928 7 Sheets-Sheet 2

Inventor
Robert Stuart Butler

By Lyon & Lyon
Attorneys

R. S. BUTLER

March 1, 1932. FILTER APPARATUS Re. 18,369

Original Filed Dec. 12, 1928 7 Sheets-Sheet 3

Inventor
Robert Stuart Butler
By Lyon & Lyon
Attorneys

R. S. BUTLER

March 1, 1932. FILTER APPARATUS Re. 18,369

Original Filed Dec. 12, 1928 7 Sheets-Sheet 4

Inventor

Robert Stuart Butler

By Lyon & Lyon

Attorneys

R. S. BUTLER
March 1, 1932. FILTER APPARATUS Re. 18,369
Original Filed Dec. 12, 1928 7 Sheets-Sheet 5
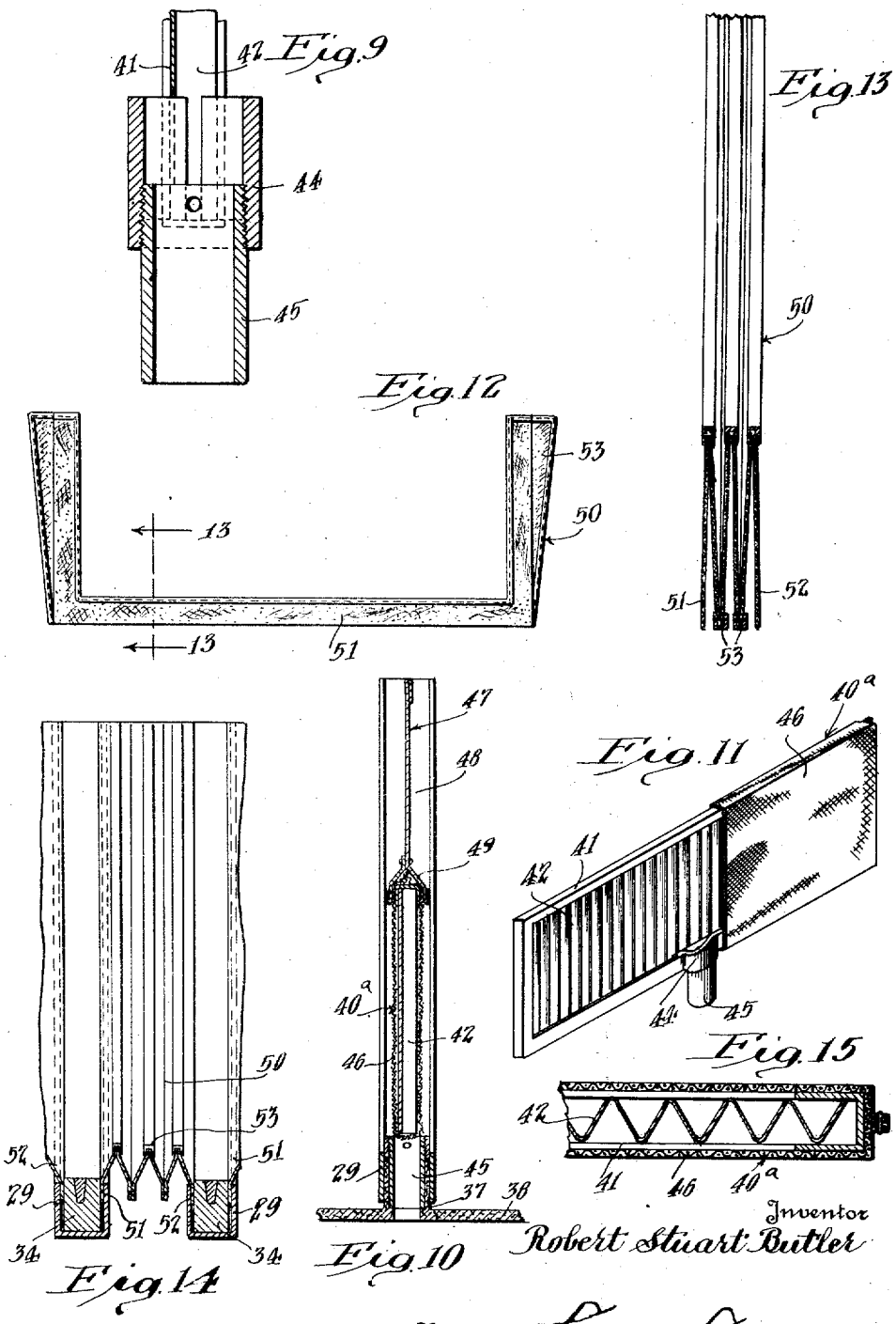
Inventor
Robert Stuart Butler
By Lyon & Lyon
Attorneys

R. S. BUTLER

FILTER APPARATUS

March 1, 1932.

Re. 18,369

Original Filed Dec. 12, 1928 7 Sheets-Sheet 6

Inventor

Robert Stuart Butler

By Lyon & Lyon

Attorneys

R. S. BUTLER

March 1, 1932. FILTER APPARATUS Re. 18,369

Original Filed Dec. 12, 1928 7 Sheets-Sheet 7

Inventor
Robert Stuart Butler

By Lyon & Lyon
Attorneys

Reissued Mar. 1, 1932

Re. 18,369

UNITED STATES PATENT OFFICE

ROBERT STUART BUTLER, OF LOS ANGELES, CALIFORNIA, ASSIGNOR, BY MESNE ASSIGNMENTS, TO NORDBERG MANUFACTURING COMPANY

FILTER APPARATUS

Original No. 1,780,905, dated November 11, 1930, Serial No. 325,468, filed December 12, 1928. Application for reissue filed March 28, 1931. Serial No. 526,075.

This invention relates to an apparatus for filtering solids from liquids.

The primary object of the present invention is to provide a continuous vacuum filter light and compact in design, mechanically simple and fully automatic in operation and possessing features not found in other filters.

The present invention relates particularly to the multiple leaf type of filter. An object of the present invention is to provide a continuous filtering apparatus affording a large filtering surface for a small floor space. Each leaf or filter plate of the filtering apparatus of this invention is a separate and individual filtering element flexibly mounted on an endless elastic or rubber belt having a series of rubber nipples into which the drainage tubes of the leaves or plates fit.

A pair of chains or other conveyor means move the leaves continuously along a stationary vacuum or differential pressure duct, the upper surface of which has a slotted opening through which the leaves, as they pass over, are placed under vacuum. The material to be filtered with the apparatus of the present invention is supplied to the apparatus by spray lines and fills the space intervening adjacent leaves.

After the leaves are filled, the apparatus of the present invention provides a means for moving the leaves relatively to a vacuum zone where filtration begins. The apparatus of the present invention is so constructed as to permit a cake to be formed on each face of the leaf and of any required thickness, leaving an inner space between the cakes in the case of difficulty or slow filtering materials or where the cake is to be washed. Or, with the apparatus of the present invention, a cake can be built up solid on the leaf when this is desirable.

The present invention also provides a means by which the wash liquid may be introduced completely filling the remaining inner space between the cakes and provides a means by which any amount of wash liquid may be applied as desired, and the time of washing lengthened to any desired time without slowing the machine or increasing or decreasing the time of formation of the cake. Moreover the wash liquid may, if desired, be applied as a spray or in a succession of sprays.

The present invention also provides an apparatus by which the leaves, after the washing and drying steps have been completed, may be removed from the vacuum duct continuously or by a continuous intermittent motion and passed over an end of the apparatus and automatically spread apart into a position in which the cake can be automatically discharged from the filter leaves. The apparatus also includes a means by which a pulsating air column may be introduced into the interior of the leaves and operate to automatically thoroughly discharge the cakes by vibrating the filter medium.

The present invention also provides a means by which any variation in filtering speed or time of travel of the leaves on the vacuum duct may be had, and moreover, the speed may be varied continually during the use of the apparatus as fluctuations and filtering conditions may require.

The present invention together with various further objects and advantages of the same will best be understood from a description of a preferred form of filtering apparatus embodying the invention. For this purpose, there is hereafter described, with reference to the accompanying drawings, a preferred form or example of such a filtering apparatus.

It will be realized that whereas I describe and show a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing.

Referring to the drawings:

Figure 9 is a fragmentary sectional elevation of one of the nipples of the filter leaves.

Figure 10 is a fragmentary sectional elevation of one of the filter leaves.

Figure 11 is a perspective view of the filter leaf.

Figure 12 is a side view of the interconnecting flexible webs between the filter leaves.

Figure 13 is an enlarged section on the line 13—13 of Figure 12.

Figure 14 is a fragmentary elevation of the filter leaves with the interconnecting web shown in position between the leaves.

Figure 15 is a section on line 15—15 of Figure 11.

Figure 1:
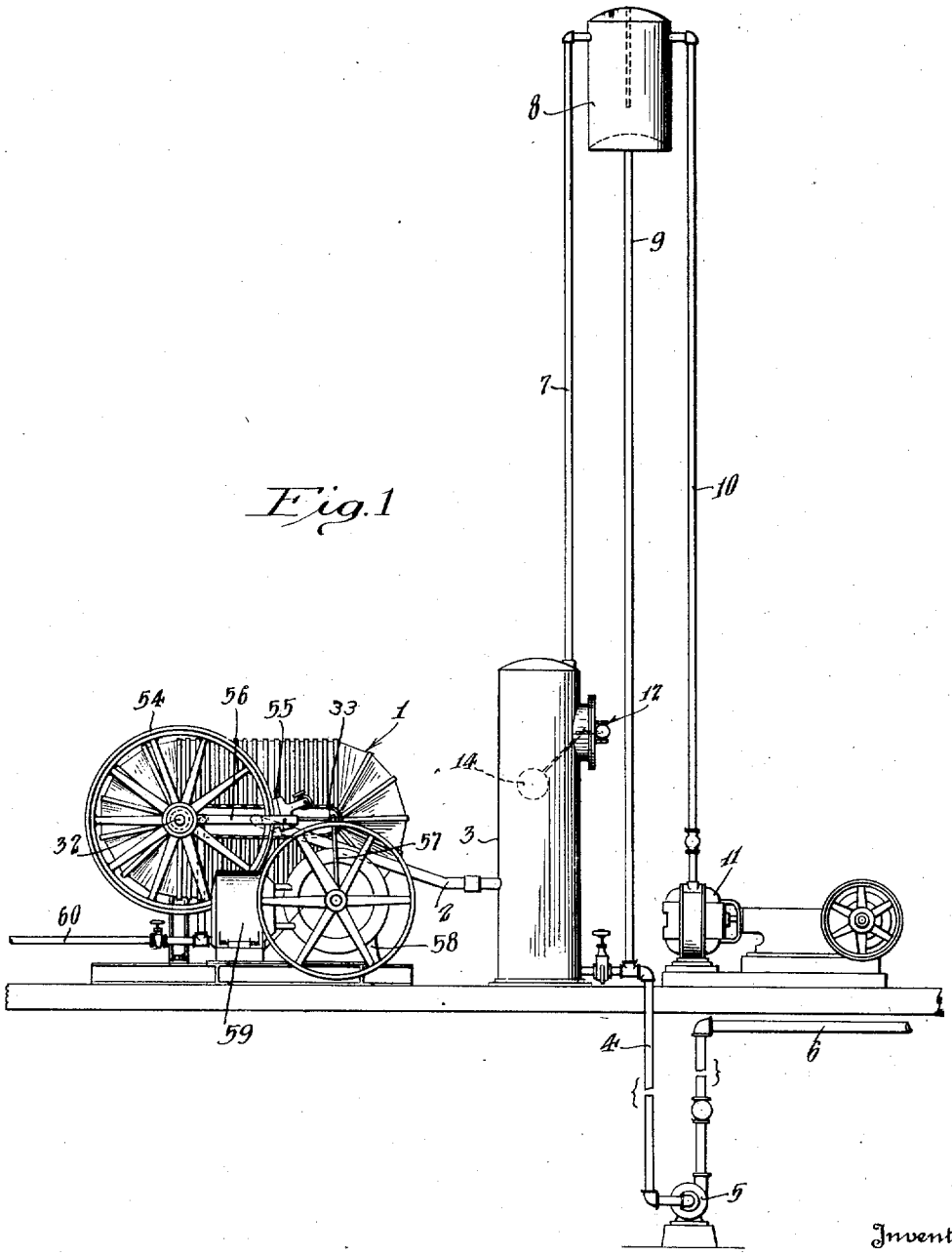
Figure 1 is an elevation showing a complete filtering apparatus including a filtrate receiver and pumping system connected to the filter proper.
Figure 2:
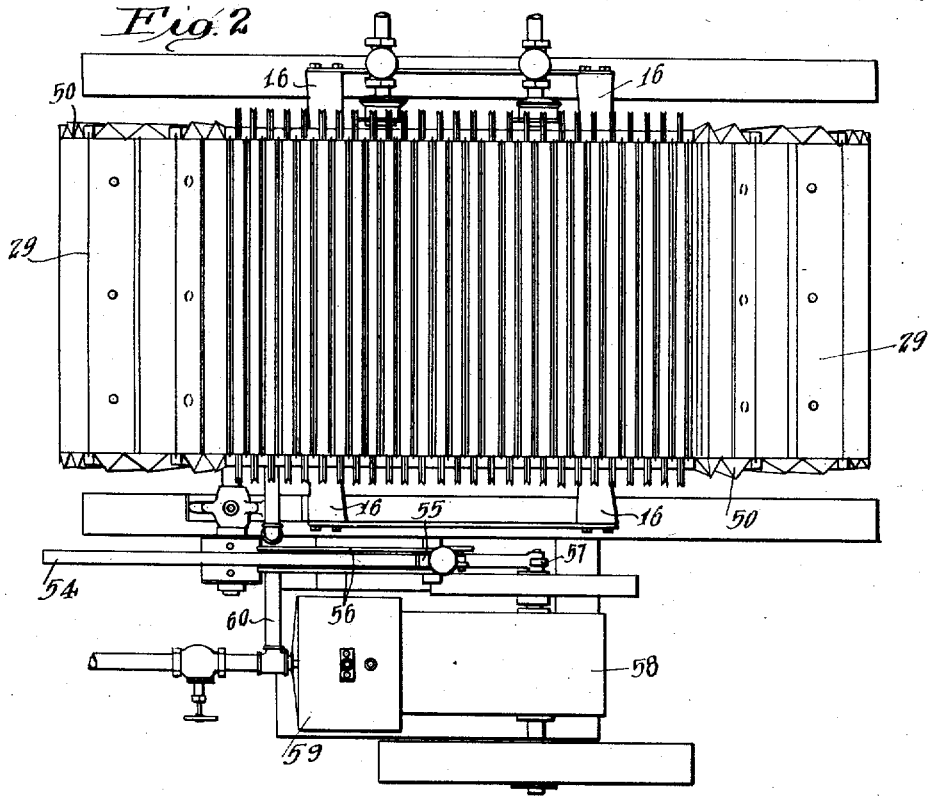
Figure 2 is a plan view of the filter.
Figure 3:
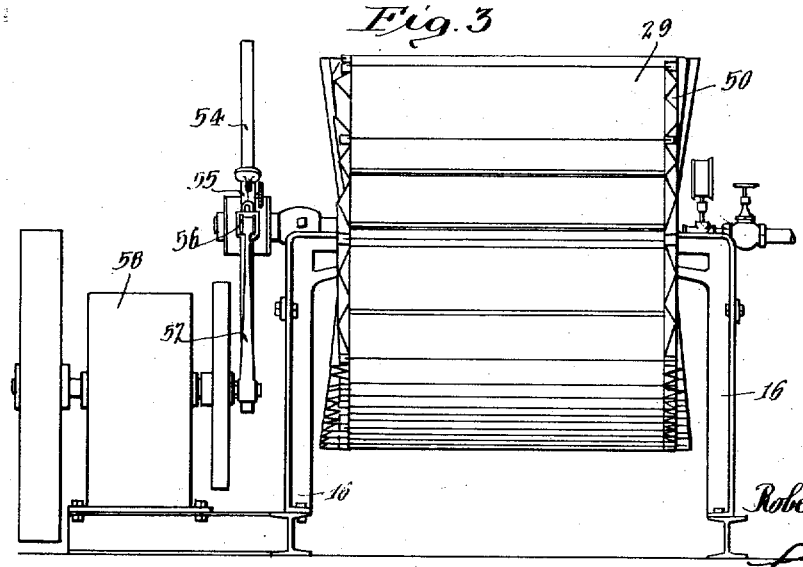
Figure 3 is an end elevation of the filter.

Referring to the drawings, particularly to Figure 1, 1 generally indicates a filter press which is connected by a line 2 to a filtrate receiver 3. The filtrate receiver 3 has a line 4 connecting with its lower end by means of which the filtrate may be withdrawn from the receiver by a pump 5 and discharged through a line 6. The filtrate receiver 3 connects with the vacuum line 7 which leads to a foam separator 8. The foam separator 8 has a line 9 connecting with the filtrate discharge line 4, also a vacuum line 10 connecting with the vacuum pump 11. There is also provided in the receiver 3, a valve 12 for releasing vacuum in the filtrate receiver 3, if the height of filtrate exceeds a predetermined height, the valve 12 being operated by the float 14.

Now referring more particularly to Figures 2 to 8 inclusive, the filter press comprises mainly a main body member or casting 15 which connects with the legs 16 by which the filter press is supported. The body member 15 is provided with a central vacuum chamber or, filtrate receiving chamber 17 which connects, as indicated at 18, with the vacuum line 2. Plug 19 is indicated by which an additional line may be connected with the vacuum chamber if desired. The body member 15 is provided longitudinally of the filter press with vacuum ducts 20 which are in the form of three long narrow ducts extending the major part of the length of the body member 15. Mounted upon the top of the body member 15 is a resilient member 21 which is preferably formed of soft rubber and is designed to form an elongated vacuum cup. Openings 22 are provided in said member 21, communicating with the main vacuum chamber 17. There is a strip of metal 23 placed in a longitudinal groove 24 in the resilient member 21 which serves to hold the cup member 21 to the base 15. 25 indicates screws for this purpose. The metal strip 23 has openings 26 therein conforming to the openings 20 in the body member 15. The member 21 is generally T-shaped in cross-section and the place under the edges of the member 21 is occupied by resilient material such as sponge rubber members 21*a* for keeping the edges of pad 21 turned up to form a cup. Working over the body member 15 is provided continuous chains 27 carrying leaf filter plates 28.

Figure 7:
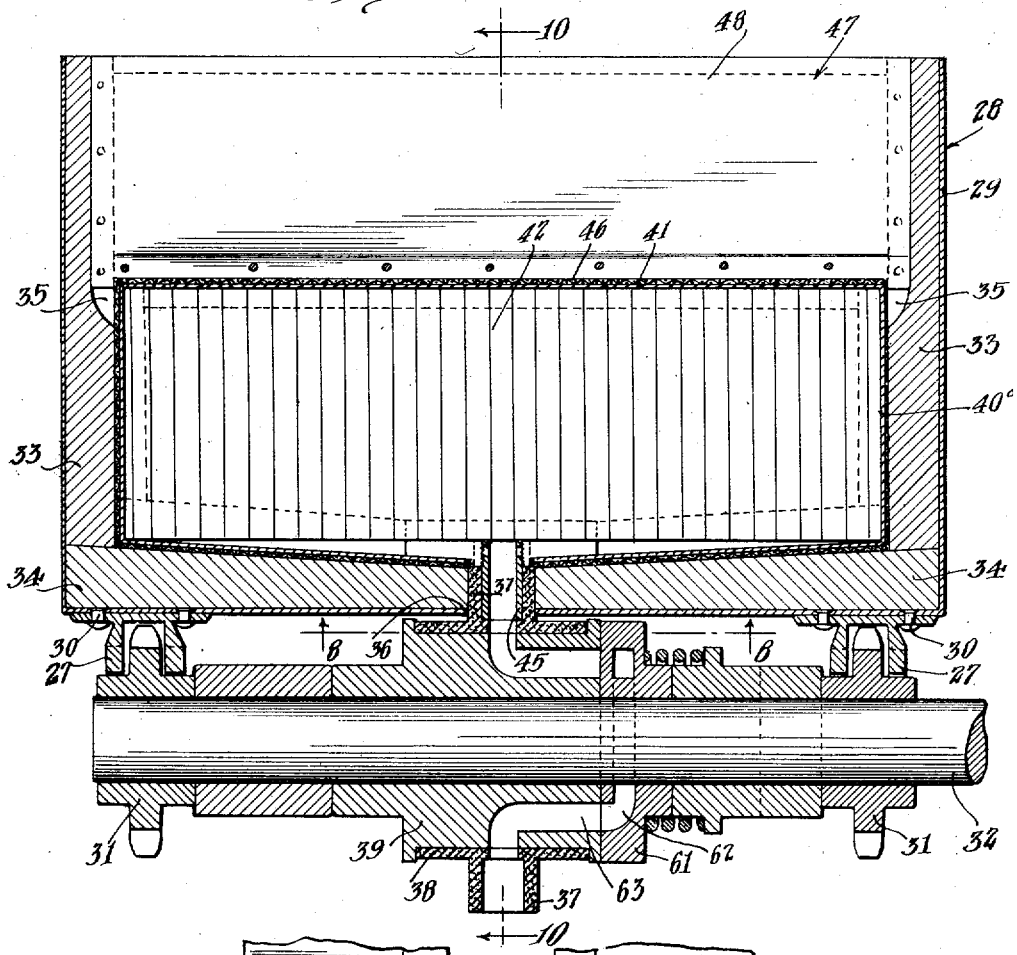
Figure 7 is a section on the line 7—7 of Figure 4.
Figure 8:
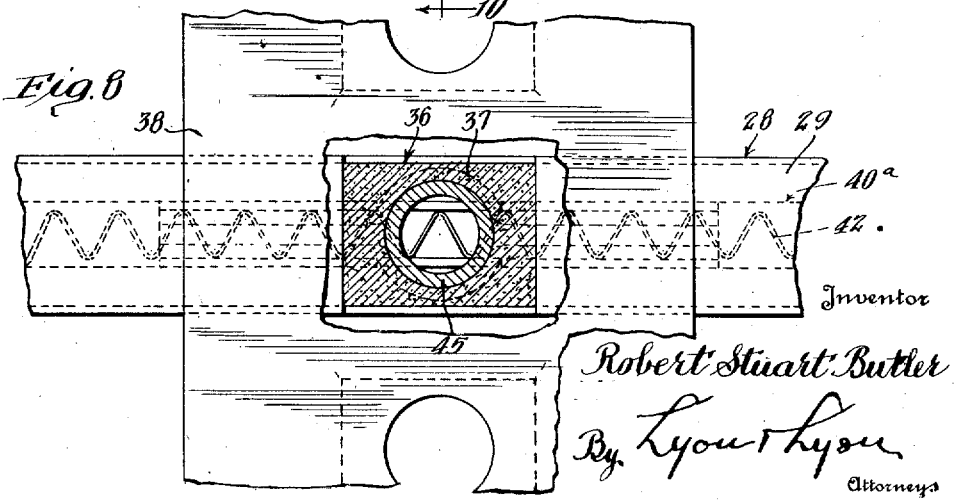
Figure 8 is a section on the line 8—8 of Figure 7.

The leaf filter plates 28, as most clearly shown in Figure 7 comprise a frame 29 formed at the sides and bottoms by channel irons and attached by bolts 30 to the links of the chains 27. The chains 27 are trained over sprockets 31 on shafts 32 and 33 at the different ends of the body 15.

The frames 29 of the filter plates or leaves have their channel irons partially filled by wood fillers, 33 indicating the fillers for the side channels and 34, the fillers of the bottom channel. The bottom fillers 34 are preferably tapered slightly towards the center of the frame in order to insure that the entire filter leaf will be drained. The side fillers 33 are provided in their upper parts with narrow, vertical slots 35. There is provided an opening 36 in the center of the frame 29, preferably square in cross section. Said opening receives hollow rectangular nipples 37 which are formed integral with a continuous resilient belt 38 which is preferably formed of soft rubber. The continuous belt 38 is positioned to pass over the elongated vacuum duct of the body 15 and also to pass over spools 39 and 40 on the shafts 32 and 33 of the apparatus. The belt 38 is thus driven by means of the frames 29, which in turn are driven by the chains 27.

In operation, a fluid-tight sliding connection of relatively low friction is established between the resilient member 21 which is secured to the base or body 15 of the apparatus and the resilient belt 38, whenever vacuum is applied to the chamber 17 of the body 15.

When vacuum is applied, this reduced pressure existing between the parts 21 and 38 causes the parts to be drawn firmly together and the resiliency of these parts permits them to establish a fluid-tight condition. It is understood, of course, it is not necessary to make both the member 21 and the belt 38 of resilient material such as rubber, but, however, it is preferable that at least one of said members be of resilient material. By having both of the members 38 and 21 made of resilient material such as rubber, not only a vacuum-tight seal is formed between these parts, but at the same time, the relative movement is permitted, without any large amount of friction being developed between them.

The leaves proper are generally indicated at 40*a* and are made detachable from the leaf frames 29. While various forms of leaves may be employed, the particular form preferred comprises a complete channel iron frame 41 which surrounds a rectangle plate or grid of corrugated metal 42, the corrugations of which form the supporting surfaces for the filter medium, the apparatus being arranged so that both sides of the plate operate as filtering areas. The bottom of the frame 41 of the leaves tapers downwardly to an enlarged hub 44 to which is threaded a drain tube 45. The drain tube 45 is of such size as to fit into the nipples 37 which are rigid with the continuous belt 38 and thus the drain tubes 45 provide a means for holding the leaves proper in position.

The frames 41 are provided with a corrugated plate 42 forming the leaf proper and the frames are covered by filter cloth which is shown as preferably in the form of a bag 46 surrounding the entire leaf proper, with the exception of the drain tube 45. The leaves 40*a* extend only partly up frames 29 in the operative position and above the leaves there are provided dash plates 47 for holding additional liquid between the filtering leaves. These plates preferably have openings 48*a* through them by which communication between the spaces for material to be filtered is permitted. The dash plates 47 are shown as formed of a plate 48, formed at its lower end with a bifurcated portion 49 adapted to seat over the top of the filter leaves proper 40. The plate portion 48 of the dash boards 47 extend beyond the bifurcated portion 49 and are adapted to be wedged into the vertical slots 35 in the side fillers 33 of the frames. When so forced into the slots 35, the plates 48 wedge the fillers 33 against the sides of the channels forming the sides of the frame 28, thereby locking the dash boards and the filter leaves proper into the filter frame 29.

The filter leaves are secured to the chains 27 so that as they pass the straight surface or line defining the filtering zone of the apparatus, the edges of the frames 29 are closely abutting. In order that a substantially fluid-tight chamber should be formed between the leaves of the filters, various means may be provided for sealing the space between adjacent frames 29 in the filtering position, but I prefer to employ webs 50 of either canvas or resilient material and particularly, in this case, folded cloth is illustrated.

The particular form of the web illustrated comprises a three-sided cloth member which has the free edges 51 and 52 for fitting between the channels of the frame of the filter leaves and the fillers therefor, to thus be held by said members in position. From the free edges, the cloth is double-backed a number of times, as indicated at 53, so that when the filter plates come to the ends of the apparatus, the folded web member may expand, as indicated, to cover the increased distances between the adjacent plates or leaves.

The continuous chain of filtering leaves is driven off the shaft 32 and for this purpose, as best illustrated in Figure 1, the shaft 32 is provided with a large drive wheel 54 which drive wheel is provided with a smooth edge and is adapted to be driven by a friction drive member 55. The friction drive member 55 is carried by an arm 56 journaled on the shaft 33 and connected to a crank arm 57 operated by a reciprocating motor 58. As the crank arm oscillates the lever 56, the friction drive member 55 rotates the wheel, a distance depending on its adjustment on the arm 56. By adjusting the position of the friction element 55, the rate of the continuous interrupted feed of the filter press leaves may be varied through a considerable range and permits a continual variation in operating speed of the apparatus as any fluctuations in filtering conditions may require.

There is also driven by the motor 58, a means for providing an oscillating fluid column such as an air column which serves to provide a means for vibrating the filter medium of the leaves to remove the cake at the discharge end of the apparatus. This means consists simply of a cylinder 59 in which a working piston (not shown) is connected with the engine 58. The piston chamber connects with the line 60 and the cylinder is without valves, so that the reciprocation of the piston within the cylinder produces a pulsating or oscillating air column giving first a positive, then a negative air pressure on the line 60.

Figures 4, 5, 6:
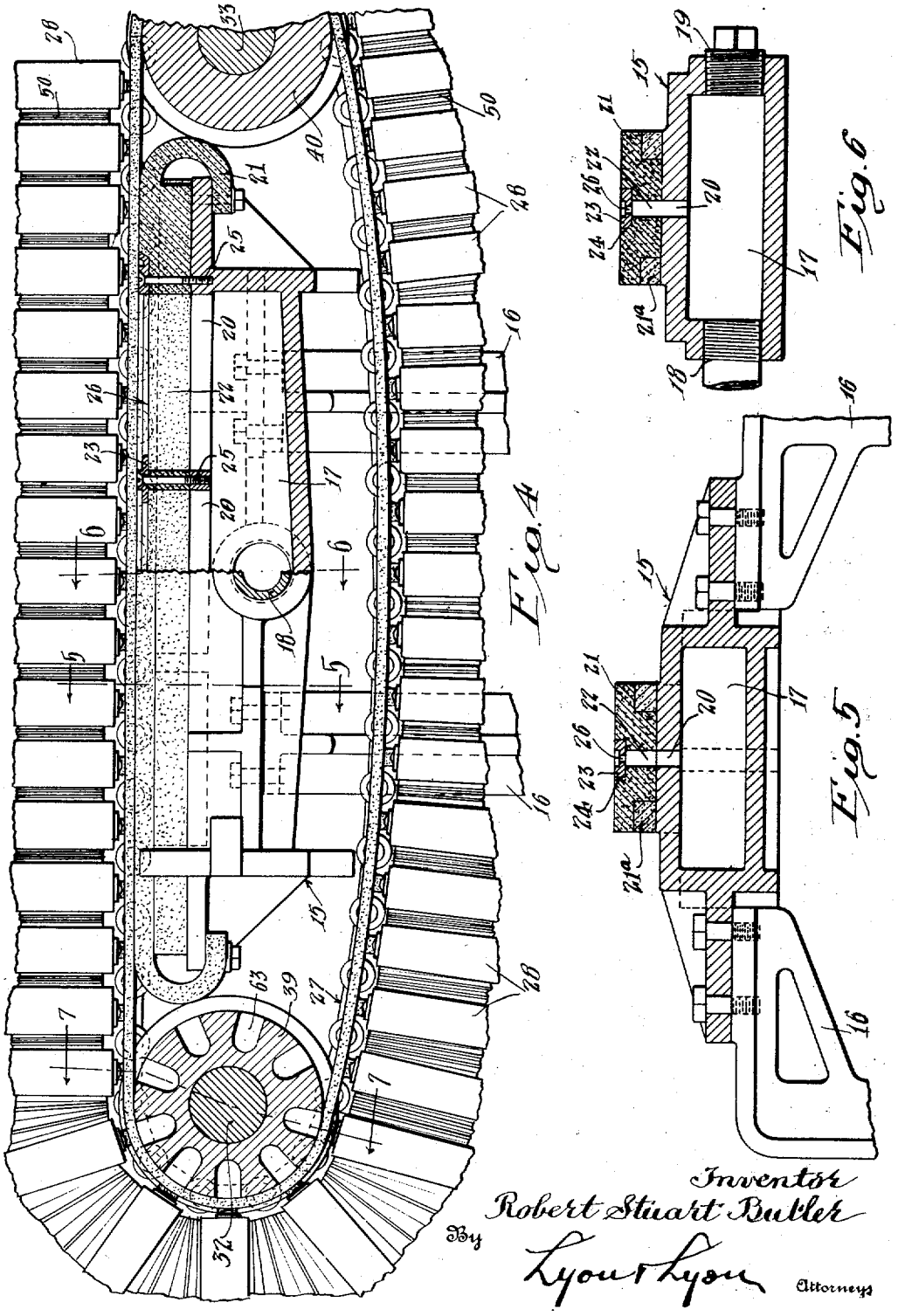
Figure 4 is an enlarged fragmentary vertical section of the filter.
Figure 5 is a section on the line 5—5 of Figure 4, with the filter leaves and conveyor removed.
Figure 6 is a section on the line 6—6 of Figure 4, with the filter leaves and conveyor removed.

The line 60 connects, as best illustrated in Figures 7 and 4, with a valve plate 61 which is journaled upon the shaft 32, and is provided with a single discharge port 62, discharging from one side of the plate into passages 63 which are formed in the spool 39 around which the belt 38 is trained. The spool 39 has a plurality of passages 63 which, at one end open radially from the spool in position to register with one or more of the hollow square nipples of the belt 38. The other opening of the passages 63 are at the side of the spool 39 facing the valve plate 61. By this arrangement, whenever the leaves are carried around the shaft 32 to the proper position, their drain tubes are connected through an outlet 62 of the valve plate 61. The oscillating air column in line 60 is applied to the interior of the filter leaves as the leaves spread, vibrating the filter medium (in this case, a filter cloth), so as to remove the filter cake which has been deposited thereon.

The means by which the filter cake is removed in the apparatus of the present invention is of special value in that it permits the apparatus to adequately dispose of the filter cake automatically and without the necessity of any brushers or scrapers which are employed on many continuous filters. The elimination of brushers or scrapers preserves the life of the filtering medium and prevents the cake being pressed into the filter cloth, clogging the same. It is understood that while this particular apparatus for disposing of a filter cake from the filter leaf is well adapted for use in connection with the continuous interrupted moving filter herein illustrated, that it is not restricted in its use to this special type of filtering apparatus, but may be employed wherever it is desired to automatically remove the cake from the filtering medium.

In operation of the present invention, the press is started into continuous interrupted motion by means of the motor driving member 58 and the vacuum pump 11 is started to place a vacuum on the receiver 3 in the vacuum chamber of the body member 15. The material to be filtered is fed into the compartments formed between the leaves at the end of the apparatus adjacent the shaft 33. No particular means have been shown for putting the material to be filtered between the leaves, as this can be done in any manner, for example, in some cases, by distributing pipe lines and other cases, by chutes.

As the material is passed over the vacuum pan or the vacuum chamber in the body 15, the filtrate is removed and after the filtrate has been sufficiently removed, the cake on the filter leaves may be readily washed by supplying washing materials through supply lines or in any other way to the compartments between the leaves.

It is understood of course that the length of travel of the filter leaves over the straight path with some materials may be greater than others, and it may be desirable for some materials to supply separate vacuum chambers for removing the wash waters.

The present invention provides a filtering apparatus in which the washing fluids may be extended relative to the filtering period in various ratios simply by adjusting the relative positions that the filtrate and wash water is fed between the confronting leaves. The apparatus of the present invention also permits the washing water or other liquid to be uniformly applied to the cake in one or a plurality of applications.

Figure 16:
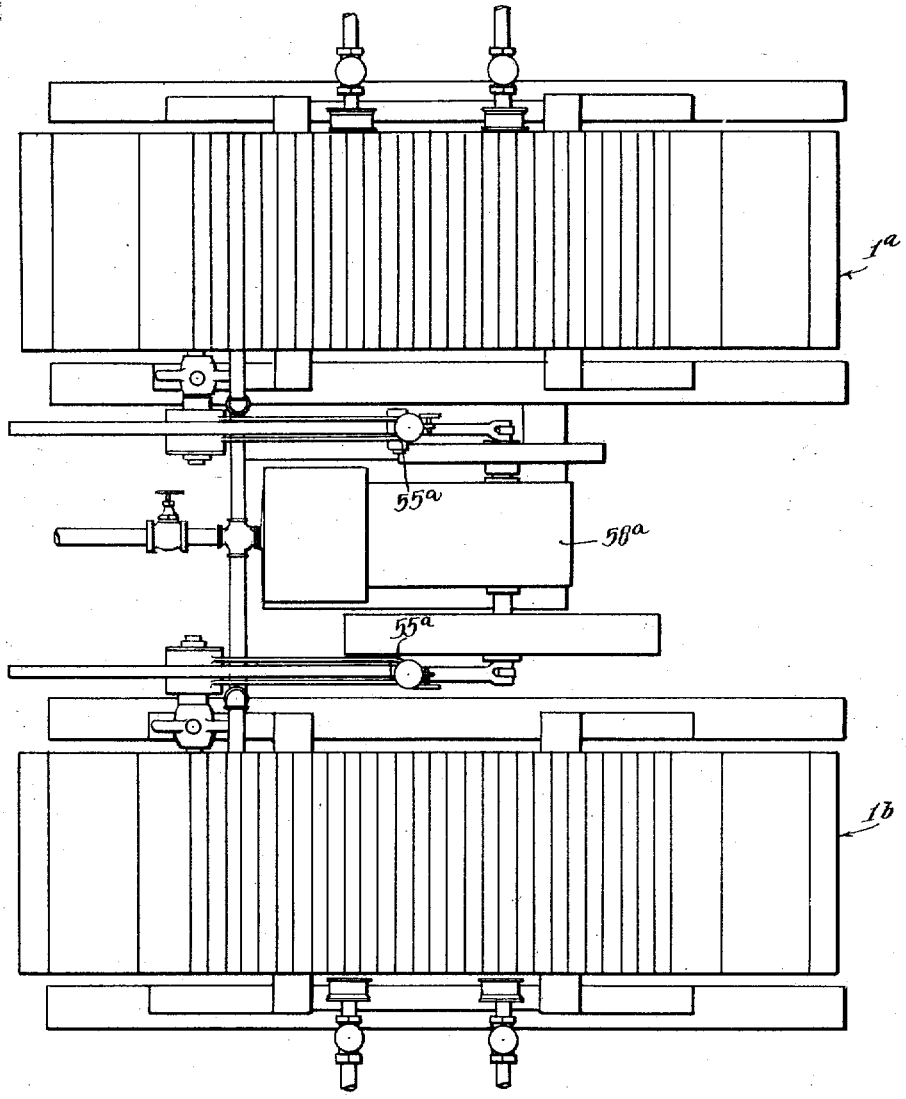
Figure 16 is a plan view of a duplex filter showing a means for driving a plurality of filters from the same motor and at variable speeds.
Figure 17:
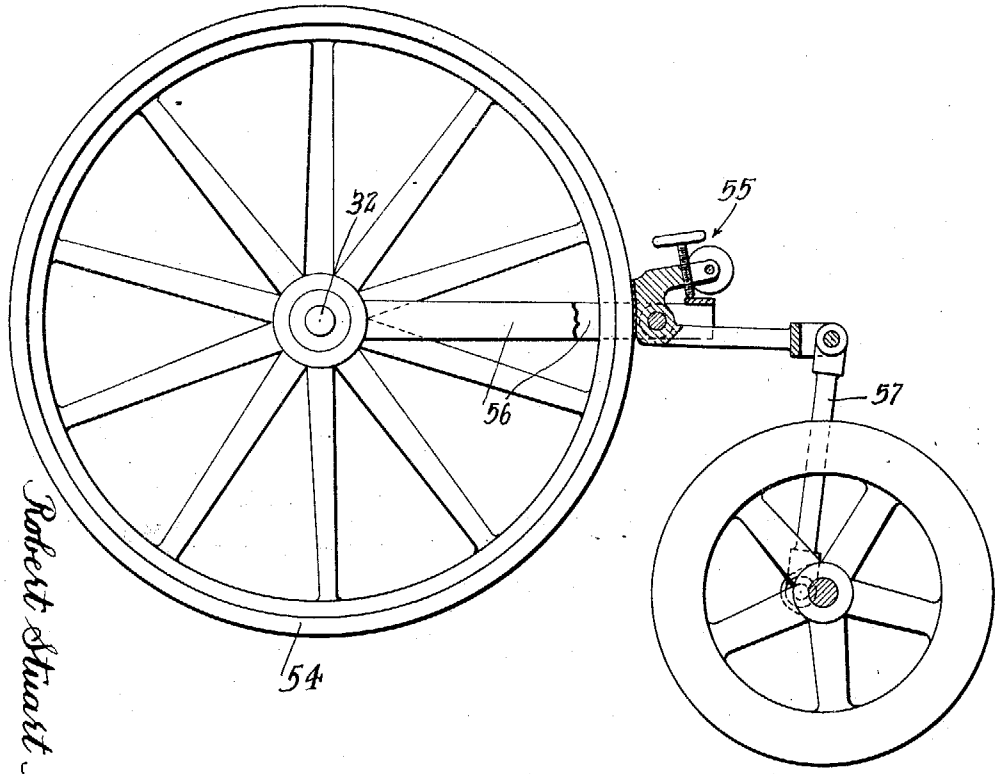
Figure 17 is a detailed enlarged view of certain of the driving parts.

Now referring to Figure 16, the form of the invention is shown in which a single motor 58*a* is connected to drive two like filters 1*a* and 1*b*. The filters thus illustrated, while driven off a single motor operating at a single speed, due to the friction driving elements 55*a*, may operate at different speeds for accommodating different liquids and each one of them is independently adjustable of the other.

While the particular form of filter apparatus herein described is well adapted to carry out the objects of the present invention, it is understood that various modifications and changes can be made without departing from the spirit of the present invention, and that all such modifications and changes come within the following appended claims.

I claim:

1. A filtering apparatus comprising a row of filter leaves with facing filter surfaces, means connecting the plates forming intermediate chambers for the material to be filtered, filtrate receiving means, means for moving the row of filter plates simultaneously with filtration and transversely to the plates and relative to said filtrate receiving means to translate the row of filter plates to and from the filtering zone, and means connecting the filtrate receiving means with said filter plates when the plates are in the filtering zone and disconnecting the filtrate receiving means with said filter plates when the filter plates pass from the filtering zone.

2. A filtering apparatus comprising a row of filter plates, filtrate receiving means, means for moving said row of filter plates simultaneously with the filtering operation and relative to said filtrate receiving means and transversely to the filter plates, and in a straight line, to translate the filter plates to and from the filtering zone, and means connecting the filter plates with said filtrate receiving means while the filter plates are in the filtering zone and for disconnecting the filter plates with said filtrate receiving means when the filter plates pass the filtering zone.

3. A filtering apparatus comprising a continuous conveying means, a continuous series of filter plates secured to said conveying means with their filtering areas confronting, whereby the filter plates are adapted to be translated through a continuous path, one portion of which path is in a substantially straight line, means for forming intermediate chambers for the liquid to be filtered between the filter plates in the filtering position, filtrate receiving means adjacent the filtering plates passing the filter position, and means for connecting said filtrate receiving means with the filtering plates occupying the filtering position.

4. A filtering apparatus comprising a filtrate receiving chamber open along an elongated filtering zone, a continuous belt movable over said zone, forming therewith a substantially fluid-tight seal, and a plurality of vertically disposed filtering members forming intermediate chambers for the liquid to be filtered, said filtering members being carried by said belt and adapted to be connected therethrough with said filtering chamber as they pass over the filtering zone.

5. A filtering apparatus comprising a filtrate receiving chamber communicating with an upwardly facing elongated sealing cup, a belt member slidable over said cup and forming a substantially fluid-tight seal therewith, and leaf filter members carried by said belt and connected therethrough to said filtrate receiving member as they traverse said elongated cup, said filter members having nipples detachably connected with said belt members.

6. A filtering apparatus comprising a filtrate receiving chamber having a substantially horizontally disposed elongated filtrate receiving zone, a continuous belt movable over said filtrate receiving zone, filter leaves connected with said belt with their filtering areas confronting, and means for forming intermediate chambers between said leaves for the liquid to be filtered, the filter leaves being in communication with said filtrate receiving chamber as they pass over the elongated filtering zone.

7. A filtering apparatus comprising a filtrate receiving chamber, said chamber having an elongated filtrate receiving zone, a continuous belt movable over said filtrate receiving zone, a continuous series of filter leaves movable with said belt and having confronting filter areas, means for forming intermediate chambers between said filter leaves for the reception of the liquid to be filtered, and an air pressure valve contacting with said belt after the belt passes from said filtering zone, operative for supplying air pressure to remove the cake from said filter leaves.

8. A filtering apparatus comprising a resilient pad, having openings extended through an elongated filtering zone, filtrate receiving means connected with said pad, a resilient belt member movable along the filtering zone and adapted to form a substantially fluid-tight connection therewith, a plurality of filtering leaves connected with said belt with their filtering areas confronting, and means for forming intermediate chambers between said leaves for the material to be filtered.

9. A filtering apparatus comprising a filtrate receiving member communicating with an elongated filtering pad, a belt movable longitudinally over said filtering pad, filter leaves carried by said belt and having drain openings extending through the belt, means for applying suction to said filtrate receiving member and thereby to said belt and pad to bring the same into fluid-tight, relation, means for automatically moving the belt and associated filtering leaves, and means for spreading the filtering leaves automatically as they leave said pad.

10. A filtering apparatus comprising a continuous belt, a continuous series of filtering leaves connected with said belt, means for moving said belt throughout a continuous path, one portion of which is in straight line, one portion of which is curved thereby to spread the leaves at the curved portion of said path, means interconnecting the leaves forming intermediate chambers for material to be filtered, an elongated zone operated at lower pressure than said leaves, and means for connecting said zone to said leaves during movement of said leaves.

11. A filtering apparatus comprising a stationary filtrate receiving member having an elongated filtrate receiving duct, a continuous belt movable over said filtrate receiving zone, filter leaves having nipples extending into openings in said belt thereby to communicate with said filtrate receiving member as they pass over the filtrate receiving duct, means for forming intermediate chambers for the liquid to be filtered between said filter leaves, and means for continuously discharging filter cake from said leaves after they pass from the filtrate receiving member.

12. A filtering apparatus comprising filtering leaves having drain tubes, a continuous belt, filter plates secured to said belt and holding said filter leaves, the drain tubes of said filter leaves communicating with filter openings through said belt, a filter receiving members having a resilient vacuum cup slidably engaging said belt, and means for driving the belt and filter plates over said filtrate receiving member during filtering operations.

13. A filtering apparatus which includes a flexible endless conveyor, a plurality of filter leaves associated with said conveyor, and positioned edgewise thereon, the faces of adjacent leaves on said conveyor being opposed to each other, said conveyor being adapted to convey said leaves in succession, and sideways along a closed path, means for subjecting said leaves, through a predetermined portion or portions of their travel along said path, to a fluid to be filtered, means for causing pressure of said fluid against the effective surfaces of said leaves, during a predetermined portion or portions of the travel of said leaves along its path, and means for freeing the cakes from the leaves.

14. A filtering apparatus which includes a flexible endless conveyor, a plurality of filter leaves associated with said conveyor, and positioned edgewise thereon, the faces of adjacent leaves on said conveyor being opposed to each other, said conveyor being adapted to convey said leaves in succession, and sideways along a closed path, means for subjecting said leaves, through a predetermined portion or portions of their travel along said path, to a fluid to be filtered, and means for causing pressure of said fluid against the effective surfaces of said leaves, during a predetermined portion or portions of the travel of said leaves along its path.

15. A filtering apparatus which includes an endless conveyor and means for guiding it through a path including curved portions and non-curved portions, a plurality of filter leaves associated with said conveyor and positioned edgewise thereon, means for subjecting said leaves, through a predetermined portion or portions of their travel along said path, to a fluid to be filtered, and means for causing pressure of said fluid against the effective surfaces of said leaves, during a predetermined portion or portions of the travel of each said plate along its path.

16. A filtering apparatus which includes an endless conveyor and means for guiding it through a path including curved portions and a generally horizontal straight portion, a plurality of filter leaves associated with said conveyor and positioned edgewise thereon, said leaves being in generally vertical position when traveling along the generally horizontal stretch of travel of the conveyor, and means for subjecting said leaves, through a predetermined portion or portions of their travel, to pressure of a fluid to be filtered.

17. A filtering apparatus which includes a conveyor and means for guiding it through a predetermined path, a plurality of filter leaves associated with said conveyor and positioned edgewise thereon, said leaves being, throughout a substantial portion of their travel, positioned face to face in relatively close proximity and in general parallelism, and means for increasing the space between adjacent leaves, adjacent the zone of discharge of the cake formed thereon.

18. A filtering apparatus which includes a conveyor and means for guiding it through a predetermined path, a plurality of filter leaves associated with said conveyor and positioned edgewise thereon, said leaves being, throughout a substantial portion of their travel, positioned face to face in relatively close proximity and in general parallelism, and means for increasing the space between adjacent leaves, adjacent the zone of discharge of the cake formed thereon, including a curved guide of relatively small radius, about which said conveyor passes.

19. A filtering apparatus which includes a plurality of filter leaves, means for positioning said filter leaves in generally upright position, face to face and in general parallelism, means for moving the leaves through a predetermined path, means for subjecting said filter leaves to a fluid to be filtered, when so positioned, means for discharging the filter cake from said leaves, and means for increasing the spacing between leaves adjacent the zone of cake discharge.

20. A filtering apparatus which includes a plurality of filter leaves, means for positioning said filter leaves face to face and in general parallelism, means for moving the leaves through a predetermined path, means for subjecting said filter leaves to a fluid to be filtered, when so positioned, means for discharging the filter cake from said leaves, and means for increasing the spacing between leaves adjacent the zone of cake discharge.

21. A filtering apparatus which includes a plurality of filter leaves, a conveyor and means for guiding it through a predetermined path, means for maintaining said filter leaves edgewise in relation to said conveyor, and generally perpendicular thereto, throughout a portion of said path, with the opposite faces of adjacent leaves generally parallel with and closely adjacent each other, means for subjecting said leaves to contact with a fluid to be filtered, means for discharging the cake from said leaves, and means for increasing the space between leaves adjacent the zone of cake discharge.

22. A filtering apparatus which includes a plurality of filter leaves, means for maintaining said filter leaves face to face and in general parallelism, means for moving said leaves, when in such relationship through a zone of filtration, means for subjecting said leaves, as they pass through said zone of filtration, to the pressure of a fluid to be filtered, means, effective subsequent to the initial subjection of the leaves to the fluid, for discharging the consequent filter cake from said leaves, and means for varying the spacing between leaves.

23. A filtering apparatus which includes a plurality of filter leaves, means for positioning said filter leaves in generally upright position, face to face and in general parallelism, means for moving said leaves when so positioned, sideways through a zone of filtration through a non-circular path, means for subjecting said leaves, as they pass through said zone of filtration, to the pressure of a fluid to be filtered, means for thereafter de-watering the cake formed on said leaves, and means for subsequently discharging the cake from said leaves.

24. A pressure connection which includes normally fixed bearing means and an extended member adapted to move thereover, sealing surfaces associated with the opposed bearing means and member, one or more ports in the bearing means, a plurality of ports in the extended member, and suction means for normally maintaining the opposed sealing surfaces of the opposed bearing means and member sealed against each other during their relative movement, the extended member being flexible.

25. A pressure connection which includes normally fixed bearing means and an extended member adapted to move thereover, sealing surfaces associated with the opposed bearing means and member, one or more ports in the bearing means, a plurality of ports in the extended member, and suction means for normally maintaining the opposed sealing surfaces of the opposed bearing means and member sealed against each other during their relative movement, the extended member being a flexible endless belt.

26. A connection for fluids, which includes a valve strip, a valve belt and means for translating the belt in relation to said strip, opposed sealing surfaces associated with belt and strip, alignable passages in belt and strip, and means for maintaining the opposed sealing surfaces sealed against each other during relative movement of opposed belt and strip, and during communication between aligned passages in belt and strip.

27. A connection for fluids which includes opposed valve members, one of said members being flexible, means for moving said flexible member in relation to the opposed member, opposed sealing surfaces associated with the two members, alignable passages in the two members, and means for maintaining the opposed sealing surfaces sealed against each other during relative movement of the opposed members and during communication of the opposed passages.

28. A connection for fluids, which includes a valve strip, a flexible valve belt and means for translating it upon said strip, opposed sealing surfaces formed on belt and strip, alignable passages in belt and strip, means for establishing a vacuum intermediate belt and strip, and maintaining the belt sealed against the strip during relative movement of strip and belt and during communication between aligned passages in belt and strip.

29. A filter which includes a vacuum chamber and means for exhausting it, a valve strip; a port in said strip in communication with said chamber, a flexible valve belt and means for translating it upon said strip, opposed sealing surfaces formed on belt and strip effective to seal said belt and strip, during movement of the belt, in response to the vacuum in said chamber, a plurality of filter leaves mounted upon said belt, said belt being formed with passages in communication with said leaves, and alignable with said port, and means for supplying to said leaves a fluid to be filtered.

30. A filter which includes a vacuum chamber and means for exhausting it, a valve strip, a port in said strip in communication with said chamber, a flexible valve belt, and means for translating it upon said strip, opposed sealing surfaces formed on belt and strip, effective to seal said belt and strip during movement of the belt, in response to the vacuum in said chamber, a plurality of apertured nipples extending outwardly from the surface of said belt opposite to the strip and a plurality of filter leaves associated with said belt, said leaves being provided with passage portions adapted to be secured in relation to said nipples, the passages of said leaves and nipples being alignable with said port in response to movement of the belt, and means for supplying said leaves a fluid to be filtered.

31. A filter which includes a vacuum chamber and means for exhausting it, a valve strip, ports in said strip in communication with said chamber, a flexible valve belt and means for translating it upon said strip, a plurality of filter leaves mounted upon said belt, said belt being formed with passages in communication with said leaves, said passages being alignable with said port, in response to movement of the belt, a ported member over which said belt passes, and means for maintaining therethrough an oscillating flow of a fluid, said oscillating flow extending into the interior of the successive filter leaves, as they pass across said ported member.

32. A filter which includes a flexible valve belt, a flexible conveyor, and a plurality of filter leaves in communication with said valve belt and mounted upon said conveyor, valve means opposed to said valve belt, the opposed belt and valve means having aligned ports and means for maintaining suction through said ports.

33. A filter which includes a flexible valve belt, a conveyor, a ported vacuum chamber and means for moving said flexible valve belt across said ports, a plurality of filter leaves, said belt being provided with ports in communication with said filter leaves, adapted to be aligned with the ports of said vacuum chamber, and means for guiding and moving the filter leaves.

34. A filter which includes a flexible valve belt, a flexible conveyor, and a plurality of filter leaves in communication with said valve belt, mounted upon said conveyor, and an actuating connection between said conveyor and said flexible belt, valve means opposed to said valve belt, the opposed belt, and valve means having aligned ports and means for maintaining suction through said ports.

35. A filter which includes a flexible valve belt, a plurality of filter leaves in communication with said valve belt, and means independent of said valve belt for actuating said leaves, valve means opposed to said valve belt, the opposed belt and valve means having aligned ports and means for maintaining suction through said ports.

36. A filter which includes a flexible valve belt, a plurality of filter leaves in communication with said valve belt, and means independent of said valve belt for supporting and guiding said leaves, said valve belt being provided with passages in communication with the interiors of said filter leaves, ported valve means opposed to said belt and means for maintaining suction through the opposed ports of valve means and belt.

37. A filter which includes a vacuum chamber, a flexible valve belt and means for passing it across said chamber, a plurality of filter leaves in communication with said valve belt, and means independent of said valve belt for supporting, moving and guiding said leaves, said valve belt being provided with passages in communication with the interiors of said filter leaves and with the interior of said vacuum chamber.

38. A filter which includes a flexible valve belt, a plurality of filter leaves in communication with said valve belt, separate means for supporting and guiding said leaves and valve belt, the connection between said filter leaves and belt including flexible apertured nipples associated with the belt and ported valve means opposed to said belt and means for maintaining suction through the opposed ports and nipples.

39. A filter which includes a flexible valve belt, a plurality of filter leaves in communication with said valve belt, and flexible connections between said leaves and said belt and ported valve means opposed to said belt, said belt being ported in opposition in alignment therewith and means for maintaining suction through the opposed ports.

40. A filter which includes a flexible valve belt, a plurality of filter leaves in communication with said belt, and a connection between said belt and each said leaf including mating members in readily removable relationship and ported valve means opposed to said belt, said belt being ported in opposition in alignment therewith and means for maintaining suction through the opposed ports.

41. A filter which includes a flexible valve belt, a plurality of filter leaves in communication with said belt, and a connection between said belt and each said leaf, each such connection including mating members in readily removable relationship with each other, and ported valve means, opposed to said belt, said connections between belt and leaf being ported in alignment with ports in said ported valve means, and suction means for maintaining a fluid-tight connection between the mating members of the connections between belt and leaf, said suction means being adapted to maintain suction through the ports of the ported valve means.

42. In a filtering device a vacuum chamber, a plurality of filter leaves, means for moving them across said chamber, said leaves being positioned edgewise to said chamber, means for delivering a substance to be filtered to said leaves as they pass above said chamber and means for retaining the fluid between sail leaves during their passage over the chamber.

43. In a filtering device a flexible valve belt, and ported valve means opposed thereto, the belt and valve means being ported in alignment, a flexible conveyor including portions positioned at each side of said valve belt, transverse connecting members connecting said conveyor portions, means for connecting said transverse members and said valve belt, filter leaves mounted upon said conveyor, and fluid conductive connections between said leaves and said belt.

44. In a filtering device, a flexible valve belt, and ported valve means opposed thereto, the belt and valve means being ported in alignment, a flexible conveyor including portions positioned at each side of said valve belt, transverse connecting members connecting said conveyor portions to each other and to said belt, filter leaves mounted upon said conveyor, and fluid conductive connections between said leaves and said belt, associated with the individual transverse connecting members.

45. In a filtering device, a flexible valve belt, and ported valve means opposed thereto, the belt and valve means being ported in alignment, a plurality of apertured nipples extending outwardly therefrom, a flexible conveyor including portions positioned at each side of said valve belt, transverse connecting members connecting said conveyor portions and said belt, the nipples being in effective connection with said transverse connecting members, filter leaves mounted upon said conveyor, and fluid conductive connections between said leaves and said nipples.

46. In a filtering device, a flexible valve belt, a normally fixed valve member and means for translating said belt in relation thereto, and a plurality of filter leaves associated with said belt.

47. In a filtering device, a flexible valve belt, a valve member opposed thereto, and means for guiding and moving said belt, including a flexible conveyor, and cross pieces connecting said conveyor and said belt, a plurality of filter leaves mounted on said belt, said belt being provided with fluid conductive means between belt and leaves, and a suction chamber associated with said valve member and adapted to maintain suction therethrough.

48. In a filtering device, a flexible valve belt, a valve member, means for translating the belt in relation to the valve member, and guiding means for said belt adapted to constrain it to a predetermined path conforming closely to the surface of the valve member across which the belt is translated, a plurality of filter leaves mounted on said belt, said belt being provided with fluid conductive means between belt and leaves, and a suction chamber associated with said valve member and adapted to maintain suction therethrough.

49. In a filter a flexible valve belt, a plurality of filter leaves associated with said belt, means for moving belt and leaves through a predetermined path, a suction system and means for maintaining an effective connection between said leaves and said suction system, through said belt, during a portion of their travel, and a cake removing system including a valve member over which said belt is guided, said valve member including an arcuate surface.

50. In a filter a flexible valve belt and a valve member opposed thereto, a plurality of filter leaves associated with said belt, means for moving belt and leaves through a predetermined path, a suction system and means for maintaining an effective connection between said leaves and said suction system, through said belt, during a portion of their travel, and a cake removing means additional to and separate from said suction system.

Signed at Los Angeles, in the county of Los Angeles and State of California, this 4th day of March, 1931.

ROBERT STUART BUTLER.